Feb. 28, 1967 — E. PAGNINI — 3,306,512
ICE CREAM DRIP TRAY
Filed Feb. 26, 1965

Edillio Pagnini
INVENTOR

BY Clarence A. O'Brien
and Harvey B. Jackson
Attorneys

United States Patent Office

3,306,512
Patented Feb. 28, 1967

3,306,512
ICE CREAM DRIP TRAY
Edillo Pagnini, Hopedale, Mass., assignor to
William V. Bellantonio, Milford, Mass.
Filed Feb. 26, 1965, Ser. No. 435,568
1 Claim. (Cl. 229—1.5)

The present invention relates to a readily applicable and removable attachment which is expressly constructed and ideally adapted for use on and in conjunction with a conventional-type frangible ice cream cone at the time the latter is charged to overflowing with meltable ice cream and is handed by the counter attendant to the purchaser in readiness for consumption and wherein said attachment constitutes and serves as a drip tray.

Persons conversant with the line of endeavor under advisement are aware that, depending upon the contemplated overall purposes and use, prior art cone attachments vary. However, and generally speaking, most of the ones which have come to attention are structurally complicated in that in addition to providing facilities for overflow drip catching needs, cone embracing and rigidifying means of one type or another is incorporated so that the end product is not just a simple drip catcher but is primarily a cone stabilizing and holding device. Despite the fact that diversified materials are on the open market and available and while many working in this field of endeavor have been able to cope with strength and appearance factors, the fact remains that for one reason or another prior art adaptations which have not been tailored to meet the use and requirements have not met with widespread adoption and use. It follows that it is a general objective to attempt to solve the problem by providing a quickly and reliably attachable drip tray which is functionally designed and structurally characterized by the utmost simplicity in construction to the extent that its adoption and use can be unreservedly endorsed by manufacturers and retailers to aptly serve the needs and purposes of prospective users.

In carrying out the principles of the present invention one aspect has to do with the adoption and use of a relatively shallow saucer-like tray which can be satisfactorily produced from an appropriate grade of blotter paper, that is a grade which attains the strength and structure characteristics required for printing of ads on at least one surface thereof.

It is within the purview of the inventive concept to employ laminated blotting paper stock which is possessed of adequate moisture absorbing wet strength properties, which is adaptable to flexual strength requirements when fashioned into shallow concavo-convex saucer-like form, is stable, easy to package and handle and otherwise effectually fabricated to accomplish the improved end results desired.

A significant objective of the invention is to enable users to cope with ice cream drippage difficulties and to thus also cope with the unpleasant consequences which are normally met by young consumers.

Briefly the present invention has to do with an improved absorbent type shallow saucer-like tray which is readily applicable and removable and which is provided at its center with an opening through which the tapering body portion of the frangible cone is passed so that it is lodged and seated in the central opening. Thus attached the tray normally stays put on the cone and traps the overflow or drippings and shields the user's hands and fingers and diminishes the often recurring need to tidy up the youngster and his clothing after having enjoyed the contents of an edible ice cream cone.

More explicitly novelty is predicated on a circular shallow concavo-convex shield or tray with the concave side facing up and wherein the aforementioned cone passing hole or opening is reinforced by a short upstanding endless flange, said flange constituting a collar, said collar being restricted to the upper or top side of the tray and serving to stabilize the overall tray and also to facilitate applying (and removing if necessary) of the tray while still maintaining the low cost manufacturing need.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
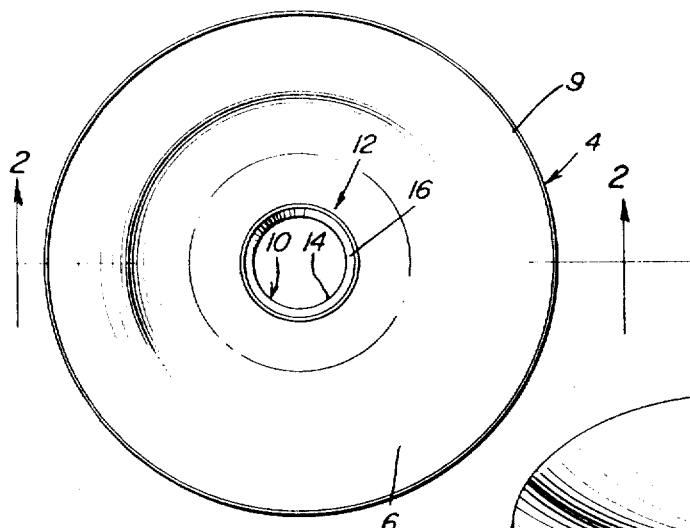
FIGURE 1 is a top plan view of an ice cream cone attachment-type drip tray constructed in accordance with the invention and observing the same in top plan.
Figure 3:
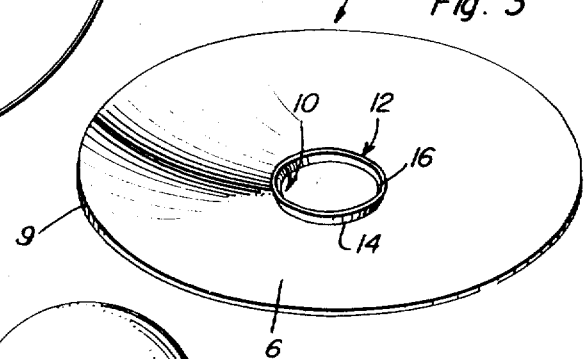
FIGURE 3 is a view in perspective of the tray by itself.
Figure 2:
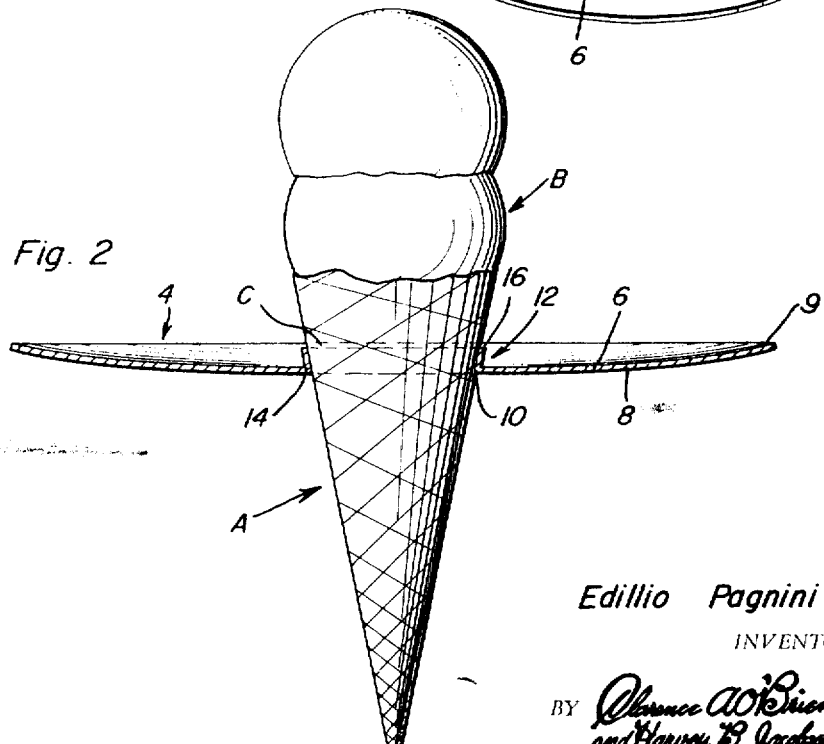
FIGURE 2 is a view on a slightly enlarged scale taken on the plane of the section line 2—2 of FIGURE 1 but showing the tray attached to the stocky upper tapering mouth portion of the loaded cone.

With reference now to FIG. 2 the conventional edible frangible ice cream cone is denoted by the reference character A, the stacked scoops of ice cream at B, the latter loaded in the upper receptacle portion C to which the shield-type drippage trapping tray 4 is applied. This tray is preferably made from single or double plies or laminations of blotting paper or an equivalent stock of requisite thickness, bendability and shape-sustaining characteristics. The finished ready-to-use shield or tray is preferably of the relative diameter shown for example in FIG. 2 and is also preferably circular in top and bottom plan. The tray is concavo-convex and the concave upper trapping and accumulating side is denoted at 6 and the convex bottom side at 8. The outer marignal or peripheral edge or rim is denoted at 9. Because of the absorbent properties of the upper surface the receptacle or tray portion can be quite shallow which adds to the extent of the ready-to-use tray and avoids the likelihood of collapsing and crumpling when the ice cream serving or counter attendant applies the attachable tray. At its axial center the tray has a circular opening or hole 10 which is of a prescribed diameter so that its marginal edge will hug and firmly bind on the upper body portion C of the cone in the manner suggested in FIG. 2. Not only this there is a relatively short endless flange 12 which is provided and which has its bottom portion 14 integrally joined to the marginal edge of the hole or opening 10 and which has its upper edge 16 in parallelism with the bottom of the tray, that is the receptacle portion 6. This collar or flange can be slightly flared to facilitate taking a frictionally retained position. It should be noted that the attachment is not a cone holder but simply a feasible economical readily attachable drip attaching tray. When applied in the manner shown the tray minimizes the likelihood of messiness attributable to drippage by gravitation. As to appearance it will be evident that the desired color and ornamental appearance features can be added by the manufacturer so that the tray has not only useful purposes for the consumer but advertising and display properties too.

The invention is of the utmost in simplicity of construction, purpose and capacity to perform that a more extended description is thought to be unnecessary.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, an inverted hollow cone-shaped container for foodstuffs such as ice cream, a generally horizontal drip tray for said container, said tray being constructed of a single horizontal panel-like body of somewhat deformable and flexible semi-stiff and liquid absorbent material and adapted to catch and absorb drippings from foodstuffs within said container which move by gravity downwardly along the outer surface of the container from the open upper major diameter end thereof, said body having a centrally disposed aperture formed therein, the inner peripheral portions of said body disposed about said aperture being struck upwardly and slightly outwardly to enlarge said aperture and form an integral, upwardly directed, vertically short and inverted truncated cone-shaped flange disposed about and defining said enlarged aperture between the inner surface portions of said flange, said cone-shaped container being wedgingly seatingly received in said enlarged aperture with the inner surfaces of said flange disposed in surface to surface contact with the opposing outer surfaces of said container spaced below the upper end thereof and above the vertical center of said container, said body, outwardly of said enlarged aperture, being imperforate in the area thereof adjacent and defining said flange and also slightly upwardly concaved so as to inherently provide additional stiffness to said body.

References Cited by the Examiner
UNITED STATES PATENTS

| | | | |
|---|---|---|---|
| 1,110,051 | 9/1914 | Harpster | 206—72 |
| 1,593,602 | 7/1926 | Scharpkuis | 206—72 |
| 2,226,237 | 12/1940 | Cooper | 206—72 X |
| 2,314,935 | 3/1943 | Gutterman | 206—72 |
| 2,321,519 | 6/1943 | Rubinoff | 229—1.5 |
| 2,948,452 | 8/1960 | Grogan et al. | 229—1.5 |
| 3,067,921 | 12/1962 | Reifers | 229—2.5 |
| 3,103,303 | 9/1963 | Lynchey | 206—72 |

JOSEPH R. LECLAIR, *Primary Examiner.*

GEORGE O. RALSTON, *Examiner.*

D. T. MOORHEAD, *Assistant Examiner.*